United States Patent Office 3,326,923
Patented June 20, 1967

3,326,923
CIS-INDOLOMORPHINANONES AND PROCESS
FOR THEIR PRODUCTION
John Shavel, Jr., Mendham, and Glenn Curtis Morrison, Dover, N.J., assignors to Warner-Lambert Pharmaceutical Company, Morris Plains, N.J., a corporation of Delaware
No Drawing. Filed Sept. 14, 1964, Ser. No. 396,363
17 Claims. (Cl. 260—288)

This invention relates to new and useful heterocyclic compounds and more particularly to new and novel cis-indolomorphinanones having the formula:

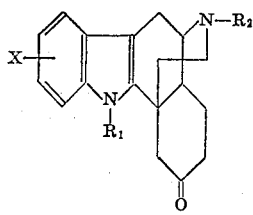

wherein $R_1$ may be hydrogen; lower alkyl such as methyl, ethyl, hexyl, and the like; cycloalkylmethyl such as cyclopropylmethyl, cyclobutylmethyl, cyclopentylmethyl, cyclohexylmethyl, and the like; aralkyl such as benzyl or benzyl substituted with 1, 2 or 3 halogen, lower alkyl or alkoxy groups and the like; acyl such as acetyl, propionyl, hexanoyl, and the like; aroyl such as benzoyl or benzoyl substituted with 1, 2 or 3 halogen, lower alkyl, or alkoxy groups and the like; heterocyclic acyl such as furoyl, pyridoyl, and the like; $R_2$ may be hydrogen, lower alkyl such as methyl, ethyl, hexyl, and the like; cycloalkylmethyl such as cyclopropylmethyl, cyclobutylmethyl, cyclopentylmethyl, cyclohexylmethyl, and the like; alkenyl such as allyl, methylallyl, dimethylallyl, and the like; aralkyl such as benzyl or benzyl substituted with 1, 2, or 3 halogen, ower alkyl or alkoxy groups, phenethyl or phenethyl substituted with 1, 2 or 3 halogen, nitro amino, lower alkyl, or alkoxy groups and the like; acyl such as acetyl, propionyl, hexanoyl, and the like; aroyl such as benzoyl or benzoyl substituted with 1, 2 or 3 halogen, lower alkyl, or alkoxy groups and the like; heterocyclic acyl such as furoyl, pyridoyl, and the like; X may be hydrogen, lower alkyl, halo, lower alkoxy, nitro, mercapto, and the like.

This invention also includes within its scope a new and novel process for preparing the above compounds as well as the intermediates obtained during the synthesis. The above compounds on treatment with acids form salts, with alkyl halides form quaternary salts, and with oxidizing agents form N-oxides; all of which are included within the scope of this invention.

It has now been found that compounds of this invention may be prepared by the following reaction sequence:

First, a m-methoxyphenethyl amine of the formula:

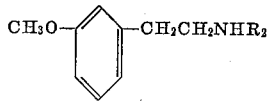

wherein $R_2$ is as defined above, is treated with either indole-acetic acid or a substituted indole-acetic acid of the formula:

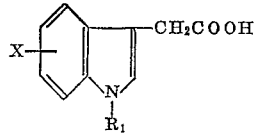

wherein X and $R_1$ are as defined above or with an ester of said acids such as methyl indole-acetate to form an amide of the formula:

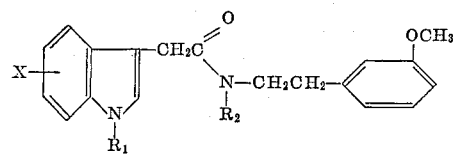

The reaction is normally carried out at a temperature of about 175 to 180° C. for about 20 to 30 hours, blanketed under a stream of nitrogen.

Second, the above amide III is then treated with phosphorous oxychloride while the reactants are at a temperature of from about 20 to 30° C. in order to ring close the amide and to form an isoquinoline nucleus having the formula:

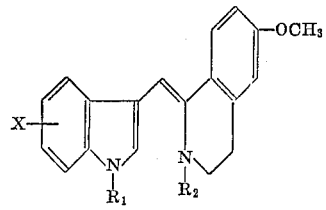

When solvents such as benzene or toluene are employed the reaction is effected at reflux temperatures of the solvent.

The third step in this reaction sequence involves treatment of compound IV with a reducing agent such as a complex metal hydride to form a compound having the following structural formula:

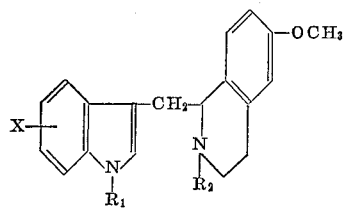

If $R_2$ in compound V is hydrogen, a substituent can be introduced at this time by treatment with an acylating agent followed by reduction; for example, acylation with ethyle formate and reduction with lithium aluminum hydride gives rise to compound V wherein $R_2$ is methyl.

The next step comprises the reduction of the methoxy substituted benzene ring of compound V with an alkali metal such as sodium in the presence of ammonia, employing a hydrogen donor such as teritary butyl alcohol. The resulting compound corresponds to the following structure:

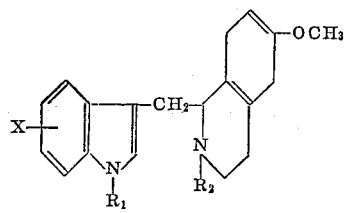

Treatment of compound VI under mild acid conditions such as treatment with oxalic acid at 25° C. results in the formation of a ketone having the formula:

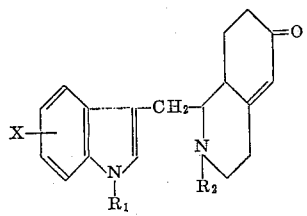

VII

Following this, treatment with a mineral acid gives rise to an indolomorphinanone compound of the formula:

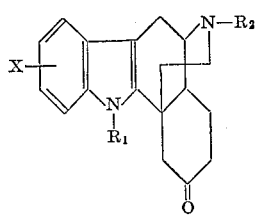

VIII

Compound VIII may also be obtained directly from compound VI by treatment with acids such as mineral acids.

The compounds of our invention exhibit significant central nervous system activity and are useful for example as analgesics, sedatives, spasmolytics, etc. In addition they are useful as intermediates for the production of other indolomorphinans. Thus, for example, compound VIII on treatment with hydrazine in the presence of alkali results in the formation of a compound of the formula:

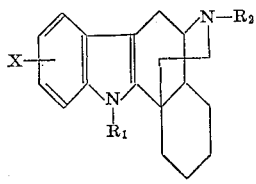

IX

The latter compound IX forms the subject matter of copending application Ser. No. 308,076 filed on Sept. 11, 1963.

The compounds of our invention may be converted into their pharmaceutically acceptable nontoxic acid addition and quaternary ammonium salts by conventional procedures. Exemplary of nontoxic acid addition salts are those formed with maleic, fumaric, succinic, tartaric, citric, malic, cinnamic, sulfonic, hydrochloric, hydrobromic, sulfuric, phosphoric, and nitric acids. The acid addition salts may be prepared in the conventional manner, by treating a solution or suspension of the free base in an organic solvent with the desired acid, and then recovering the salt which forms by crystallization techniques. The quaternary salts are prepared by heating a suspension of the free base in a solvent with a reactive halide such as methyl iodide, ethyl bromide, n-hexyl bromide, benzyl chloride or a reactive ester such as methyl sulfate, ethyl sulfate or methyl p-toluene sulfonate. The methohydroxides are prepared by passing the corresponding methiodide through an ion exchange column containing hydroxide ions whereas the corresponding N-oxides are prepared by treating the free base with hydrogen peroxide.

For therapeutic use, our compounds, either as the free base or in the form of salts, may be combined with conventional pharmaceutical diluents and carriers to form such dosage units as tablets, capsules, suppositories, elixirs, solutions and suspensions.

The following examples are included in order further to illustrate the present invention:

EXAMPLE 1

N-(m-methoxyphenethyl)indole-3-acetamide

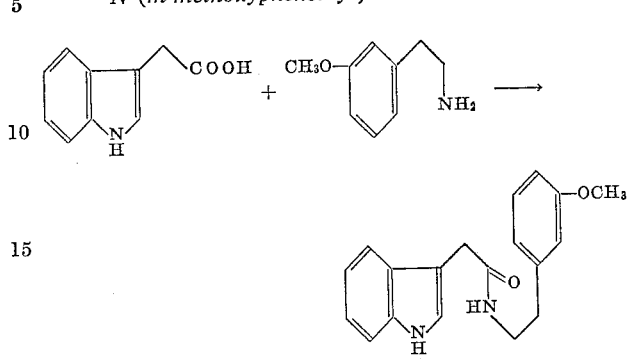

A mixture of 150 g. of indole-3-acetic acid and 140 g. of m-methoxyphenethylamine is heated for 20 hours at 175°–180° C. under a stream of nitrogen. The reaction mixture is dissolved in 1200 ml. of chloroform and washed with 5% hydrochloric acid, 5% sodium carbonate solution, and water. Removal of the solvent gives 220 g. (83%) of N-(m-methoxyphenethyl)indole-3-acetamide as a viscous gum. Distillation of this crude product through a short pass still gives an analytical sample, B.P. 250° (block temperature, 0.15 mm.);

$\lambda_{max.}^{EtOH}$ m$\mu$ ($\epsilon$) 219 (42,200), 272 (7,800), 281 (8,000), 289 (5,500)

Analysis for $C_{19}H_{20}N_2O_2$. Calcd.: C, 74.00; H, 6.59; N, 9.08. Found: C, 74.05; H, 6.53; N, 9.08.

EXAMPLE 2

3,4 - dihydro-1-(indol-3-ylmethyl)-6-methoxyisoquinoline

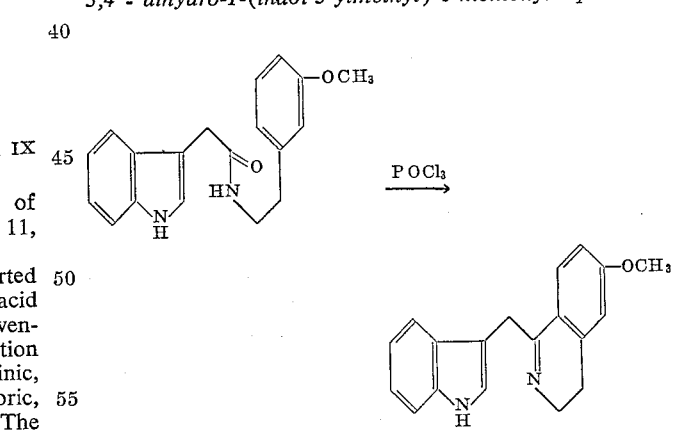

To a solution of 81.3 g. of N-(m-methoxyphenethyl)indole-3-acetamide in 400 ml. of benzene is added 250 ml. of phosphorous oxychloride and the resulting solution refluxed for 3 hours. The reaction mixture is poured into 3 liters of ether. The resulting precipitate (62 g.) is dissolved in ethanol, neutralized with sodium hydroxide solution and extracted with chloroform. The chloroform layer is washed with water and dried over sodium sulfate. Removal of the solvent from the chloroform extract gives 17.5 g. (23%) of 3,4-dihydro-1-(indol-3-ylmethyl)-6-methoxyisoquinoline as a crystalline solid, M.P. 148–150° C. Recrystallization from benzene gives an analytical sample, M.P. 143–145° C.;

$\lambda_{max.}^{0.1\ N\ HCl}$ m$\mu$ ($\epsilon$) 317 (16,700)

Analysis for $C_{19}H_{18}N_2O$. Calcd: C, 78.59; H, 6.25; N, 9.65. Found: C, 78.30; H, 6.10; N, 9.42.

EXAMPLE 3

*1,2,3,4-tetrahydro-1-tetrahydro-1-(indol-3-ylmethyl)-6-methoxy-isoquinoline*

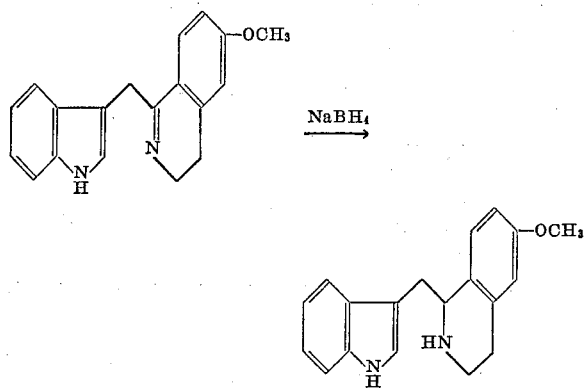

To 550 ml. of phosphorous oxychloride is added 219 g. of N-(m-methoxyphenethyl)indole-3-acetamide. The mixture is swirled by hand until dissolution has been completed and then allowed to stand at room temperature (25 to 30° C.) for 50 hours. The reaction mixture is poured into 3.5 liters of ether. The precipitate is dissolved in 1900 ml. of ethanol, 300 ml. of water added, and the solution made basic with 10% sodium hydroxide solution. The pH is then adjusted to 3 with 20% hydrochloric acid and 60 g. of sodium borohydride added portionwise while cooling with an ice bath so that the temperature remains at about 20–30° C. The pH is readjusted to 3 several times during the addition of the sodium borohydride. After the addition has been completed the reaction mixture is acidified with hydrochloric acid, made basic with sodium hydroxide solution, and extracted with ether. The ether layer is washed with water and dried over sodium sulfate. Removal of the solvent gives 78 g. (38%) of 1,2,3,4 - tetrahydro - 1-(indol-3-ylmethyl)-6-methoxy-isoquinoline as a crystalline solid, M.P. 160–162° C. Recrystallization from benzene gives an analytical sample, M.P. 160–161.5° C.;

$\lambda_{max.}^{EtOH}$ m$\mu$ ($\epsilon$) 222 (42,000), 281 (8,000), 289 sh (6,100)

Analysis for $C_{19}H_{20}N_2O$. Calcd: C, 78.05; H, 6.89; N, 9.58. Found: C, 77.85; H, 6.80; N, 9.32.

EXAMPLE 4

*1,2,3,4-tetrahydro-1-(indol-3-ylmethyl)-6-methoxy-2-methyl-isoquinoline*

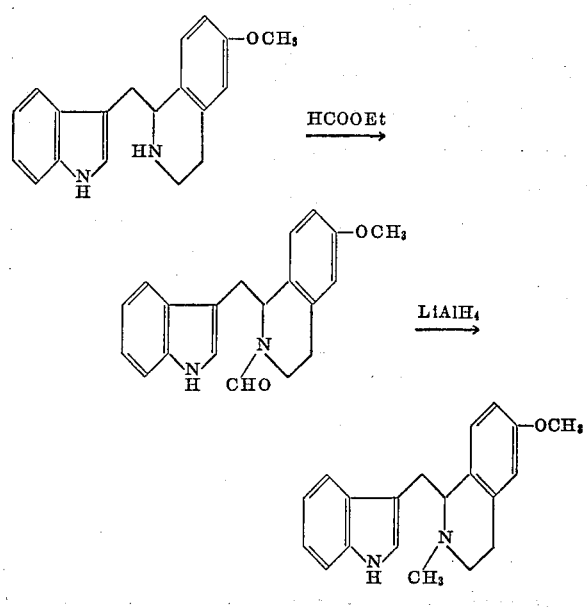

A mixture of 25 g. of 1,2,3,4-tetrahydro-1-(indol-3-ylmethyl)-6-methoxyisoquinoline and 500 ml. of ethyl formate is refluxed for 20 hours. The reaction mixture is filtered and the excess ethyl formate removed in vacuo. The residue is dissolved in 500 ml. of tetrahydrofuran and 12.0 g. of lithium aluminum hydride is added slowly with cooling such that the temperature remains at 20–30° C. After the addition has been completed, stirring is continued at about room temperature (25 to 30° C.) for an additional 2 hour period. The reaction mixture is decomposed by addition of water and 40% sodium hydroxide. The tetrahydrofuran layer is decanted, dried over sodium sulfate, and the solvent removed. The residue after crystallization from acetonitrile gives 16.7 g. (64%) of 1,2,3,4 - tetrahydro - 1-(indol-3-ylmethyl)-6-methoxy-2-methyl-isoquinoline as a crystalline solid, M.P. 124–126° C. Further recrystallization gives an analytical sample, M.P. 128–129.5° C.;

$\lambda_{max.}^{EtOH}$ m$\mu$ ($\epsilon$) 223 (42,000), 281 (7,600), 290 sh (6,000)

Analysis for $C_{20}H_{22}N_2O$. Calcd: C, 78.40; H, 7.24; N, 9.14. Found: C, 78.52; H, 7.07; N, 8.86.

EXAMPLE 5

*1,2,3,4,5,8-hexahydro-(1-indolyl-3-ylmethyl)-6-methoxyisoquinoline*

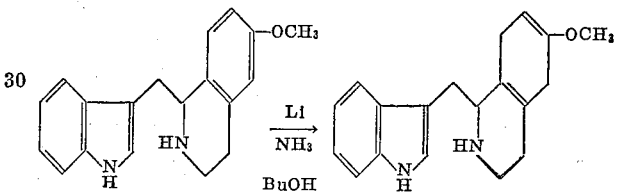

To a solution of 4.0 g. of 1,2,3,4-tetrahydro-1-(indol-3-ylmethyl)-6-methoxy-isoquinoline in 150 ml. of tetrahydrofuran is added 300 ml. of ammonia. Then 4.0 g. of sodium and 35 ml. of tert.-butanol are added alternately in six equal portions over a one hour interval. One hour after this addition has been completed, 1.0 g. of sodium is added and stirring continued for an additional hour. The excess sodium is destroyed by the dropwise addition of methanol and the ammonia allowed to evaporate. On pouring the reaction mixture into 700 ml. of water there is deposited 3.0 g. (74%) of 1,2,3,4,5,8-hexahydro-(1-indolyl - 3 - ylmethyl) - 6 - methoxyisoquinoline in the form of a crystalline solid, M.P. 153–155° C. Recrystallization from benzene gives an analytical sample, M.P. 155–156° C.;

$\lambda_{max.}^{EtOH}$ m$\mu$ ($\epsilon$) 221 (36,800), 271 sh (5,100), 281 (5,800), 289 (5,000)

EXAMPLE 6

*1,2,3,4,5,8-hexahydro-1-(indol-3-ylmethyl)-6-methoxy-2-methylisoquinoline*

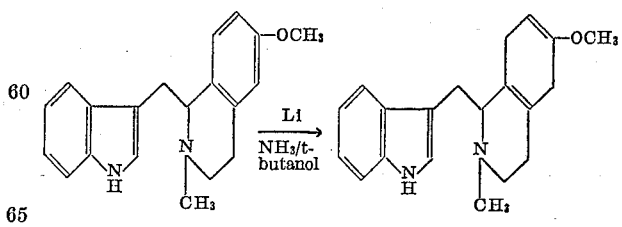

To a solution of 12.0 g. of 1,2,3,4-tetrahydro-1-(indol-3-ylmethyl)-6-methoxy-2-methylisoquinoline in 200 ml. of tetrahydrofuran is added 400 ml. of ammonia. Then 5.0 g. of sodium and 24 ml. of tert.-butanol are added alternately in six equal portions. One hour after this addition has been completed 0.5 g. of sodium is added and stirring continued for an additional hour. The excess sodium is destroyed by the dropwise addition of methanol and the ammonia allowed to evaporate. On pouring the reaction mixture into 600 ml. of cold water there is deposited 8.0 g. (66%) of 1,2,3,4,5,8-hexahydro-1-(indol-3-ylmethyl) - 6 - methoxy - 2 - methylisoquinoline as a crystalline solid which melts at 123° to 126° C. and then resolidifies to give a melting point of 136–138° C. Recrystallization from benzene gives an analytical sample, M.P. 139.5–140.5° C.;

$\lambda_{max.}^{EtOH}$ m$\mu$ ($\epsilon$) 223 (37,000), 275 sh (5,700), 282 (6,100) 290 (5,400).

Analysis for $C_{20}H_{14}N_2O$. Calcd.: C, 77.89; H, 7.84; N, 9.08. Found: C, 77.76; H, 7.92; N, 9.16.

EXAMPLE 7

*1,2,3,4,8,8a-hexahydro-1-(indol-3-ylmethyl)-6-(7H)-isoquinolone*

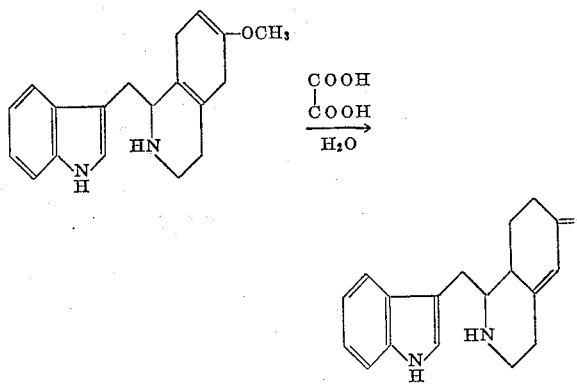

A solution of 1.0 g. of 1,2,3,4,5,8-hexahydro-1-(indol-3 - ylmethyl) - 6 - methoxyisoquinoline, in 100 ml. of methanol is mixed with a solution of 1.33 g. of oxalic acid in 20 ml. of water and allowed to stand at about room temperature (25 to 30° C.) for 135 minutes. The reaction mixture is poured into 200 ml. of ether, washed with 10% sodium carbonate solution, water, and dried over sodium sulfate. The solvent is removed and the residue chromatographed on neutral alumina. Elution with 2% methanol in ether gives after recrystallization from benzene, 0.10 g. (10%) of 1,2,3,4,8,8a-hexahydro-1-(indol-3-ylmethyl)-6-(7H)-isoquinolone as a crystalline solid, M.P. 201–202° C.;

$\gamma_{max.}^{CHCl_3}$ 1620 (C=C), 1666 (C=O) cm.$^{-1}$; $\lambda_{max.}^{EtOH}$ m$\mu$ ($\epsilon$) 221 (44,000), 272 (7,500), 281 (7,600), 290 (6,500).

Analysis for $C_{18}H_{20}N_2O$. Calcd.: C, 77.11; H, 7.19; N, 9.99. Found: C, 77.32; H, 7.20; N, 9.91.

EXAMPLE 8

*4a,11b-cis-3,4,4a,5,6,11-hexahydro-5,11b-imino-ethano-11bH-benzo [a] carbazol-2(1H)-one*

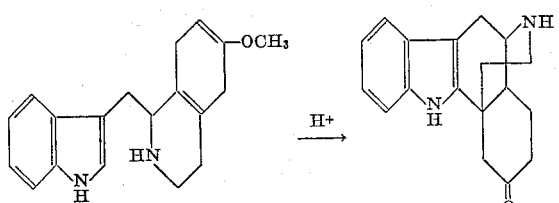

A solution of 4.4 g. of 1,2,3,4,5,8-hexahydro-(1-indolyl-3-ylmethyl)-6-methoxyisoquinoline and 45 ml. of hydrochloric acid in 150 ml. of methanol is refluxed for 1 hour. The reaction mixture is diluted with 45 ml. of water, the methanol stripped in vacuo, and made basic with sodium hydroxide. Filtration gives a solid which after recrystallization from ether gives 0.90 g. (22%) of 4a,11b-cis-3,4, 4a,5,6,11-hexahydro-5,11b-imino - ethano - 11bH-benzo [a] carbazol-2(1H)-one as a crystalline solid, M.P. 199–199.5° C.;

$\gamma_{max.}^{CHCl_3}$ 1707 (C=O) cm.$^{-1}$; $\lambda_{max.}^{EtOH}$ m$\mu$ ($\epsilon$) 225 (37,600), 274 sh (7,000), 282 (7,400) 290, (6,700)

Analysis for $C_{18}H_{20}N_2O$. Calcd.: C, 77.11; H, 7.19; N, 9.99. Found: C, 77.08; H, 7.23; N, 9.74.

EXAMPLE 9

*4a,11b-cis-3,4,4a,5,6,11-hexahydro-14-methyl-5,11b-iminoethano-11bH-benzo [a] carbazol-2(1H)-one*

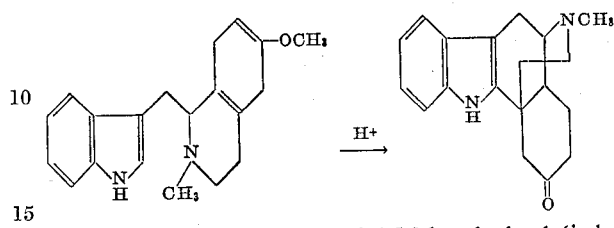

A solution of 5.0 g. of 1,2,3,4,5,8-hexahydro-1-(indol-3-ylmethyl)-6-methoxy-2-methylisoquinoline and 45 ml. of hydrochloric acid in 125 ml. of methanol is refluxed for one hour. The reaction mixture is diluted with 70 ml. of water, the methanol stripped in vacuo, and is made basic with 40% sodium hydroxide solution. Filtration gives a solid which after recrystallization from benzene gives 3.2 g. (67%) of 4a,11b-cis-3,4,4a,5,6,11-hexahydro-14-methyl-5,11b-iminoethano-11bH - benzo [a] carbazol-2 (1H)-one in the form of a solid, M.P. 234–235° C. Further recrystallization gives an analytical sample, M.P. 234.5–235.5° C.;

$\gamma_{max.}^{CHCl_3}$ 1710 cm.$^{-1}$; $\lambda_{max.}^{EtOH}$ m$\mu$ ($\epsilon$) 226 (37,000), 274 sh (7,000), 282 (7,500), 290 (7,000)

Analysis for $C_{19}H_{22}N_2O$. Calcd: C, 77.52; H, 7.52; N, 9.52. Found: C, 77.56; H, 7.71; N, 9.52.

EXAMPLE 10

*Cis-2-methylcyclohex [j] indolo [2,3-f] morphinan*

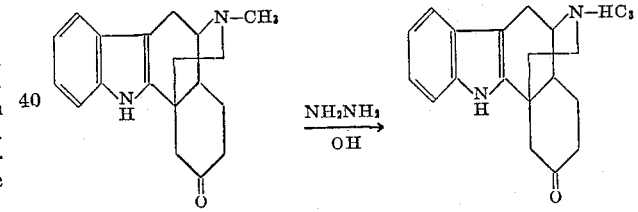

A solution of 2.0 g. of 4a,11b-cis-3,4,4a,5,6,11-hexahydro - 14-methyl-5,11b-iminoethano-11bH-benzocarbazol-2 (1H)-one, 1.6 g. of sodium hydroxide, and 30 g. of hydrazine hydrate in 80 ml. of ethylene glycol is refluxed for one hour. Then the overhead is removed until the temperature of the distillate reaches 192° C., after which heating is continued for three hours. On pouring the reaction mixture into 750 ml. of water there is deposited 1.1 g. (58%) of a solid, M.P. 130–137° C. Recrystallization from Skelly B which consists essentially of hexane gives a purified sample, M.P. 138–140° C.

It is to be understood that the foregoing detailed description is given merely by way of illustration and that many variations may be made therein without departing from the spirit of our invention.

Having described our invention, what we desire to secure by Letters Patent is:

1. A member selected from the group consisting of the free base of the formula:

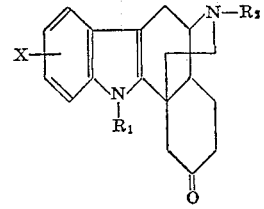

wherein $R_1$ is a member of the group consisting of hydrogen, lower alkyl, phenyl lower alkyl, carboxylic acyl and aroyl; $R_2$ is a member of the group consisting of hydrogen, lower alkyl, cycloalkylmethyl, lower alkenyl, phenethyl and substituted phenethyl; and X is a member of the group consisting of hydrogen, lower alkyl, halogen and, lower alkoxy, and the nontoxic pharmaceutically acceptable acid addition salts.

2. A compound of the formula:

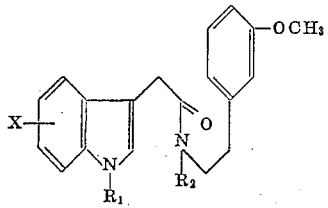

wherein $R_1$ is a member of the group consisting of hydrogen, lower alkyl, phenyl lower alkyl, carboxylic acyl and aroyl; $R_2$ is a member of the group consisting of hydrogen, lower alkyl, cycloalkylmethyl, lower alkenyl, phenethyl and substituted phenethyl; and X is a member of the group consisting of hydrogen, lower alkyl, halogen and lower alkoxy.

3. A compound of the formula:

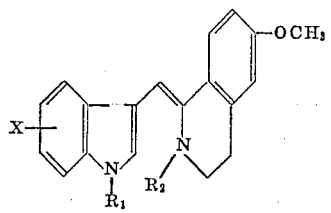

wherein $R_1$ is a member of the group consisting of hydrogen, lower alkyl, phenyl lower alkyl, carboxylic acyl and aroyl; $R_2$ is a member of the group consisting of hydrogen, lower alkyl, cycloalkylmethyl, lower alkenyl, phenethyl and substituted phenethyl; and X is a member of the group consisting of hydrogen, lower alkyl, halogen, lower alkoxy, nitro and mercapto.

4. 3,4 - dihydro - 1 - (indol - 3 - ylmethyl)-6-methoxy-isoquinoline.

5. Process for the production of a compound of the formula:

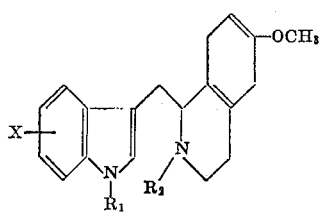

wherein $R_1$ is a member of the group consisting of hydrogen, lower alkyl, phenyl lower alkyl, carboxylic acyl and aroyl; $R_2$ is a member of the group consisting of hydrogen, lower alkyl, cycloalkylmethyl, lower alkenyl, phenethyl and substituted phenethyl; and X is a member of the group consisting of hydrogen, lower alkyl, halogen and lower alkoxy, which comprises contacting a compound of the formula:

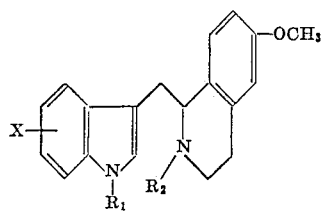

with sodium in the presence of a hydrogen donor and employing liquid ammonia as a solvent system.

6. Process according to claim 5 wherein said hydrogen donor is tertiary butyl alcohol.

7. A compound of the formula:

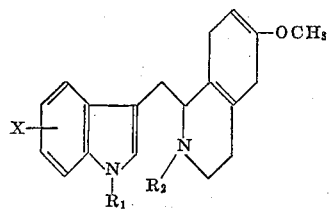

wherein $R_1$ is a member of the group consisting of hydrogen, lower alkyl, phenyl lower alkyl, carboxylic acyl and aroyl; $R_2$ is a member of the group consisting of hydrogen, lower alkyl, cycloalkylmethyl, lower alkenyl, phenethyl and substituted phenethyl; and X is a member of the group consisting of hydrogen, lower alkyl, halogen and lower alkoxy, the nontoxic pharmaceutically acceptable acid addition salts.

8. 1,2,3,4,5,8 - hexahydro - (1 - indolyl-3-ylmethyl)-6-methoxyisoquinoline.

9. 1,2,3,4,5,8 - hexahydro - 1 - (indol - 3-ylmethyl)-6-methoxy-2-methylisoquinoline.

10. Process for the production of a compound of the formula:

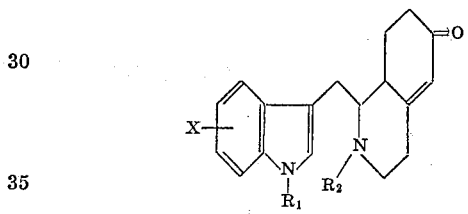

wherein $R_1$ is a member of the group consisting of hydrogen, lower alkyl, phenyl lower alkyl, carboxylic acyl and aroyl; $R_2$ is a member of the group consisting of hydrogen, lower alkyl, cycloalkylmethyl, lower alkenyl, phenethyl and substituted phenethyl; and X is a member of the group consisting of hydrogen, lower alkyl, halogen and lower alkoxy, which comprises contacting a compound of the formula:

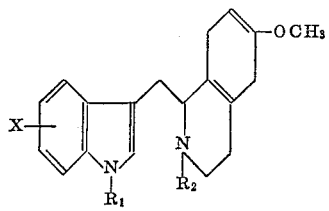

with oxalic acid.

11. A compound of the formula:

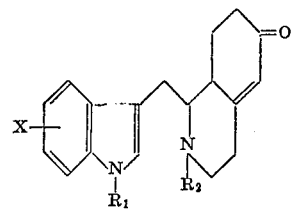

wherein $R_1$ is a member of the group consisting of hydrogen, lower alkyl, phenyl lower alkyl, carboxylic acyl and aroyl; $R_2$ is a member of the group consisting of hydrogen, lower alkyl, cycloalkylmethyl, lower alkenyl, phenethyl and substituted phenethyl; and X is a member of the group consisting of hydrogen, lower alkyl, halogen and lower alkoxy.

12. 1,2,3,4,8,8a - hexahydro - 1 - (indol-3-ylmethyl)-6 (7H)-isoquinolone.

13. Process for the production of a compound of the formula:

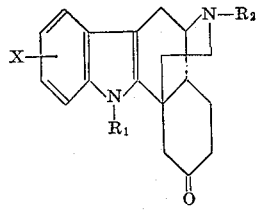

wherein $R_1$ is a member of the group consisting of hydrogen, lower alkyl, phenyl lower alkyl, carboxylic acyl and aroyl; $R_2$ is a member of the group consisting of hydrogen, lower alkyl, cycloalkylmethyl, lower alkenyl, phenethyl and substituted phenethyl; and X is a member of the group consisting of hydrogen, lower alkyl, halogen and lower alkoxy, which comprises contacting a compound of the formula:

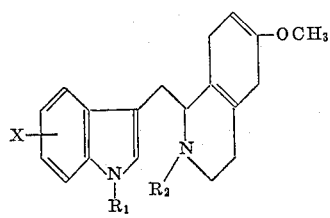

with a strong mineral acid.

14. Process for the production of a compound of the formula:

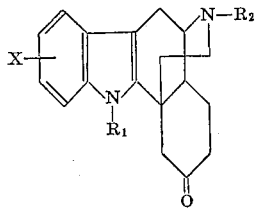

wherein $R_1$ is a member of the group consisting of hydrogen, lower alkyl, phenyl lower alkyl, carboxylic acyl, and aroyl; $R_2$ is a member of the group consisting of hydrogen, lower alkyl, cycloalkylmethyl, lower alkenyl, phenethyl and substituted phenethyl; and X is a member of the group consisting of hydrogen, lower alkyl, halogen and lower alkoxy, which comprises contacting a compound of the formula:

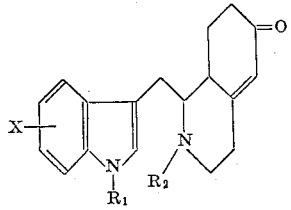

with a strong mineral acid.

15. 4a,11b - cis - 3,4,4a,5,6,11 - hexahydro - 5,11b-imino-ethano-11bH-benzo[a]carbazol-2(1H)-one.

16. 4a,11b - cis - 3,4,4a,5,6,11 - hexahydro-14-methyl-5,11b-iminoethano-11bH-benzo[a]carbazol-2(1H)-one.

17. Cis-2-methylcyclohex[j]indolo[2,3-f]-morphinan.

References Cited

UNITED STATES PATENTS 2,814,625  11/1957  Speeter _____ 260—296
3,153,043  10/1964  Weisbach _____ 260—288

OTHER REFERENCES

Gaylord: Reduction With Metal Complexes, Interscience 1956, pp. 86–7, 100–103, 496–7.

ALEX MAZEL, *Primary Examiner.*

DONALD G. DAUS, *Assistant Examiner.*